United States Patent [19]
Maekawa et al.

[11] 3,739,868
[45] June 19, 1973

[54] FLUID POWER STEERING APPARATUS

[75] Inventors: Tadashi Maekawa; Akira Suzuki; Shigenori Haramura, all of Kariya, Japan

[73] Assignee: Aisin Seiki Kabushiki Kaisha, Aichi-ken, Japan

[22] Filed: Feb. 19, 1971

[21] Appl. No.: 116,760

[30] Foreign Application Priority Data
Feb. 23, 1970 Japan.............................. 45/15452

[52] U.S. Cl............... 180/79.2 R, 91/380, 91/465, 91/422
[51] Int. Cl............................................. B62d 5/08
[58] Field of Search................ 180/79.2 R; 91/374, 91/380, 422, 465; 60/52 S; 74/388 PS

[56] References Cited
UNITED STATES PATENTS

| | | | |
|---|---|---|---|
| 3,602,101 | 8/1971 | Jablonsky et al................... | 91/422 |
| 3,180,233 | 4/1965 | Jablonsky............................ | 91/374 |
| 2,930,357 | 3/1960 | Brueder............................... | 91/465 X |
| 2,938,503 | 5/1960 | Lauks................................... | 91/465 |
| 3,407,844 | 10/1968 | Linser................................... | 91/374 |
| 3,553,966 | 1/1971 | Liebert................................. | 91/374 X |

Primary Examiner—Benjamin Hersh
Assistant Examiner—Leslie J. Paperner
Attorney—Berman, Davidson & Berman

[57] ABSTRACT

Disclosed herein is a fluid power steering apparatus for vehicles. A hydraulic circuit including a pressure source is connected to a cylinder having a piston slidably engaged therein to define a pair of opposed pressure chambers therein. The piston is connected to a sector-shaft which in turn is connected to the steering road wheels. A rotatable member is confined within the piston and connected to a manually actuated shaft. A pair of control valves mounted in the piston are adapted to be displaced relatively in opposite directions by the rotatable member. The pair of control valves are positioned in the piston during assembly and are fixed normally in the neutral positions thereof to make the assembly easy and simple giving the control valves accurate and durable performance.

5 Claims, 4 Drawing Figures

INVENTORS.
TADASHI MAEKAWA,
AKIRA SUZUKI,
SHIGENORI HARAMURA,

BY Berman, Davidson & Berman,
ATTORNEYS.

FLUID POWER STEERING APPARATUS

The present invention relates to a fluid power steering apparatus for vehicles, and more particularly to an improvement of the hydraulic controlling device for the fluid power sterring apparatus.

The performance and durability of fluid power steering apparatus, may well be determined by the accuracy of the hydraulic control device which controls fluid pressure supplied to the cylinder. The fluid pressure responds to rotation of a manually actuated shaft to move a piston within the cylinder and therethrough to operate a sector-shaft connected to the steering road wheels of the vehicle.

In such hydraulic control devices a pair of control valves are confined within the piston in the cylinder and are displaced relatively in opposite directions by action of a rotatable member to control the pressure supplied from a pressure source to opposed pressure chambers defined respectively in the cylinder by the piston. It has however been well noted that in the use of control valves as mentioned, absolute importance exists in establishing accuracy of the relative positions of the spools of each of the pair of control valves when they are in the neutral position so as to completely eliminate any relative play of the spools.

An object of the present invention is to provide a fluid power steering apparatus in which the control valves may easily and accurately be assembled and fixed in the neutral positions of the spools.

Another important object of the present invention is to provide a fluid power steering apparatus wherein relative play between the spools of the pair of control valves is eliminated thus assuring reliable performance of the control valves.

A still further object of the present invention is to provide a fluid power steering apparatus as described above wherein the control valves are simple in construction and easy to assemble while operating with great durability over long periods of time without the need for adjustment or maintenance.

Other objects and advantages will become apparent in the following specification when considered in the light of the attached drawings.

DESCRIPTION OF THE PREFERRED EMBODIMENT

Figure 1:
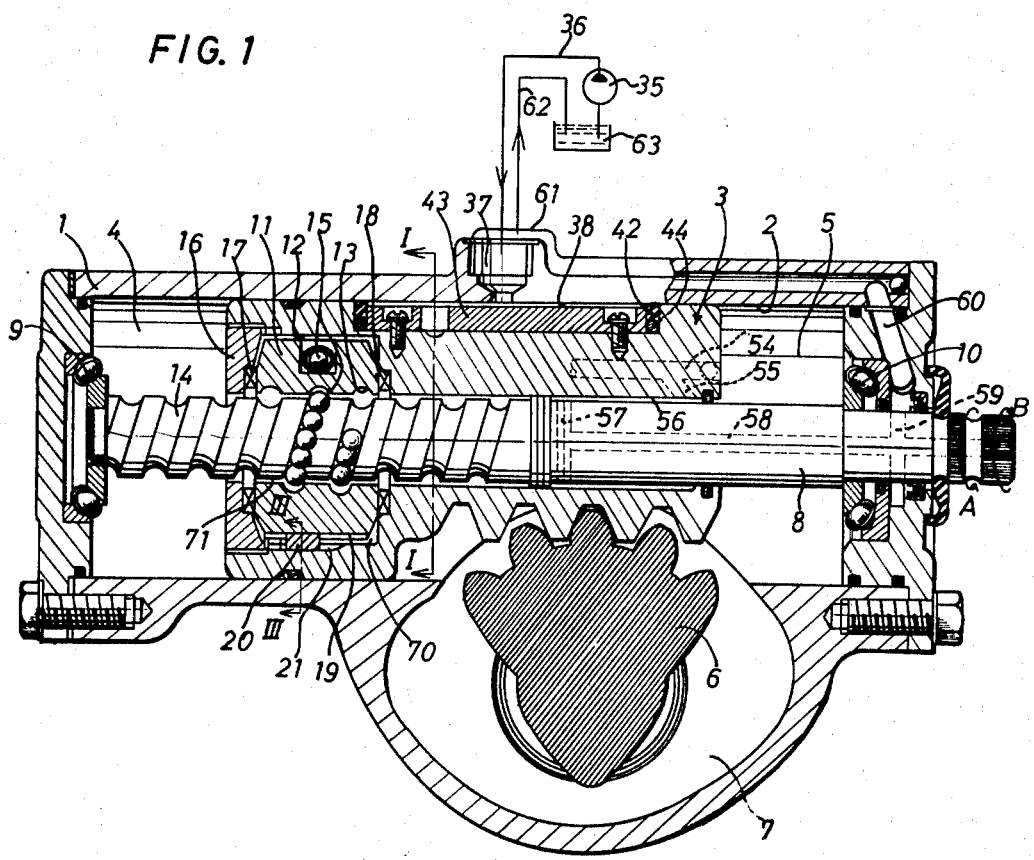
FIG. 1 is a longitudinal sectional view of the invention.

Referring now to the drawings in detail wherein like reference characters indicate like parts throughout the several figures the reference numeral 1 indicates a housing having a cylinder bore 2 extending therethrough. A piston 3 is mounted for reciprocation in the bore 2 and forms a left pressure chamber 4 and a right pressure chamber 5 as viewed in FIG. 1. A sector-shaft 6 is mounted in a chamber 7 placed below and communicating with the pressure chamber 5. The sector-shaft 6 is conventionally connected to vehicle road steering wheels (not shown) for steering the vehicle. The sector-shaft 6 has a sector arc of gear teeth formed thereon and meshing with rack teeth integrally formed on the piston 3.

A steering shaft 8 extends axially through the piston 3 and is supported at its opposite ends by ball bearings 9, 10 which prevent axial movement of the steering shaft 8 while supporting it for rotation. The steering shaft 8 is conventionally connected to the steering wheel (not shown) of the vehicle.

A steering nut 11 is confined within a relatively large cylindrical bore 12 formed in the left end of the piston 3 with sufficient clearance to permit limited radial swinging. The steering nut 11 is formed with a spiral groove 13 extending through an axial bore and the shaft 8 has a spiral groove 14 on the outer surface of the portion thereof extending through the steering nut 11. The steering nut 11 is connected to the shaft 8 by a plurality of balls 15 interposed in the spiral grooves 13, 14.

Figure 4:
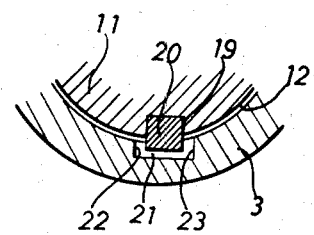
FIG. 4 is an enlarged fragmentary transverse sectional view taken on the line III—III of FIG. 1, looking in the direction of the arrows.

A lock screw 16 is threaded into the bore 12 securing the steering nut 11 therein between bearings 17 and 18 at opposite ends thereof. The bearings 17 and 18 secure the steering nut 11 to prevent it from moving axially with respect to the piston 3 while permitting it to rotate with respect thereto. The steering nut 11 has a longitudinal groove 19 formed in the lower portion of its circumference as viewed in FIGS. 1 and 4 and a key 20 is mounted therein extending outwardly to engage in a groove 21 extending longitudinally of the wall of the cylindrical bore 12 of the piston 3. The groove 21 has spaced apart shoulders 22, 23 forming the sides of the groove 21 and these shoulders 22, 23 form a groove 21 which is somewhat wider then the key 20. The key 20 permits manual operation of the device upon failure of the power steering apparatus.

Figure 2:
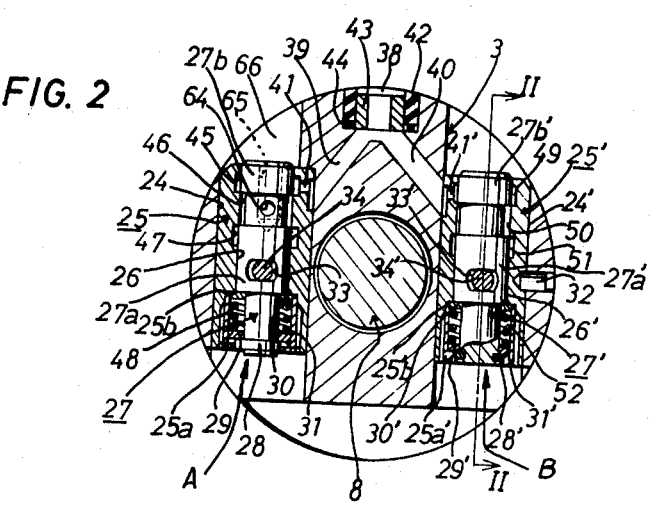
FIG. 2 is a transverse sectional view of the piston removed from the cylinder, taken on line I—I of FIG. 1, looking in the direction of the arrows.
Figure 3:
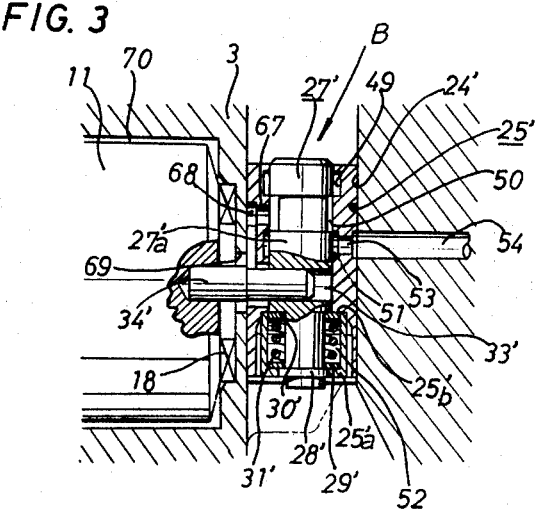
FIG. 3 is an enlarged fragmentary longitudinal sectional view taken along the line II—II of FIG. 2, looking in the direction of the arrows.

A pair of bores 24, 24', see FIGS. 2 and 3, are drilled in the position 3 symmetrically with their axes lying in a plane perpendicular to the axis of the piston 3. A control valve indicated generally at A is mounted in the bore 24 and a second control valve indicated generally at B is mounted in the bore 24'. The control valve A when assembled and pressed into the bore 24 includes an outer sleeve 25 and a polished bore 26 in which a spool valve 27 is mounted for axial sliding movement. The spool valve 27 has a land 27a formed thereon and a snap ring 28 is fixed to the end of the spool valve 27 in spaced relation to the land 27a. Spaced parallel retainers 29, 30 engage respectively the land 27a and the snap ring 28 and a compression coil spring 31 is interposed therebetween to normally maintain the spool valve 27 in neutral position within the housing 25. A threaded retainer 25a is threaded into the outer sleeve 25 against the lower end of the retainer 29 to secure the valve 27 in the bore 26 and to eliminate relative play between the outer sleeve 25 and the valve 27.

The sleeve 25 being pressed into the bore 24 is fixed against movement therein and its position is determined by a shoulder at the inner end of the bore 24.

The control valve B is constructed nearly identically to the control valve A and includes a housing 25' having a bore 26' extending therethrough. A spool valve 27' is mounted for axial sliding movement in the bore 26' and has a land 27'a formed thereon. A snap ring 28' is engaged in a groove adjacent the lower end of the spool valve 27' and a pair of spaced apart parallel retainers 29', 30' engage respectively against the land 27'a and the snap ring 28' with a coil compression spring 31' engaged therebetween. A threaded retainer 25'a locks the spool valve 27' into the bore 26' with the coil spring 31' normally maintaining the spool valve 27' in neutral position within the sleeve 25'.

The sleeve 25' is moveably mounted in the bore 24' for axial adjustment during assembly.

The spool valve 27 has a transverse hole 33 extending therethrough with a transverse width substantially greater than its longitudinal dimension. The spool valve 27' has a similar transverse hole 33' extending therethrough. The nut 11 has a pair of projecting drive pins 34, 34' extending upwardly therefrom to engage in the holes 33, 33' respectively. In assembling the device the nut 11 is positioned with the drive pins 34, 34' engaged in the holes 33, 33' following which a pin 32 is engaged through the wall of the piston 3 piercing the bore 24' to lock the sleeve 25' against axial movement in the bore 24'.

Described below is the operation of the fluid circuits of the power steering apparatus described above. A pump 35 is connected by a conduit 36 to an inlet port 37 in the housing 1. An outlet port 61 of the housing 1 is connected by a conduit 62 to a reservoir 63 from which the pump 35 receives fluid.

The inlet port 37 opens into a longitudinal groove 38 formed in the wall of the piston 3. The groove 38 has a length equal to the overall length of the movement of the piston 3 in the housing 1 so that some portion of the groove 38 is constantly in communication with the inlet port 37. Passages 39 and 40, as seen in FIG. 2, extend from the groove 38 to respectively communicate with the bores 24, 24'. The passageway 39 communicates with a radial hole 41 formed in the sleeve 25 and the passageway 40 communicates with a radial hole 41' formed in the sleeve 25'. A sealing member 42 extends peripherally about the edges of the groove 38 and is held in place therein by a holding member 43. A resilient member 44 engages under the sealing member 42 in the bottom of the groove 38 to press outwardly thereon effectively preventing leakage of the operation fluid into the pressure chambers 4 and 5.

Annular chambers 45, 46, 47 and 48 are formed between the outer sleeve 25 and the lands 27a, 27b on the spool valve 27. The annular chamber 45 communicates with the radial holes 41 and the chamber 47 constantly communicates with the reservoir 63. A bore 54 extends through the piston 3 parallel to the shaft axis thereof and a slant passage hole 55 communicates the hole 54 with the space 56 between the piston 3 and the steering shaft 8. A radial bore 57 extends completely through the shaft 8 communicating with the space 56 at each end thereof and with an axial bore 58 formed in the shaft 8. A radial passage hole 59 extends into the steering shaft 8 communicating with the axial passage hole 58 and communicates at its outer end with a passageway 60 formed in the housing 1. The passageway 60 communicates with the outlet port 61 so that fluid flowing therethrough may return to the reservoir 63. The pressure chambers 4, 5 and 7 are sealed against loss of fluid by suitable sealing members applied conventionally where required.

The valve B and the spool 27' has lands 27'a and 27'b which assist in forming annular chambers 49, 50, 51, and 52 with the outer sleeve 25'. The annular chamber 49 is communicated respectively with the radial hole 41' in the outer sleeve 25'. The chamber 51 is constantly open to the reservoir 63 through radial passage 53 and axial passage hole 54.

As seen in FIG. 2, the annular chamber 46 is in constant communication with the right pressure chamber 5 through a radial hole 64 in the spool valve 27 and an axial passageway 65 formed therein. A hole 66 formed in the piston 3 opens toward the right in FIG. 1 and communicates with the chambers 5 and 7. The annular chamber 50 is as best illustrated in FIGS. 1 and 3 constantly open to the left pressure chamber 4 through a radial hole 67 formed in the outer sleeve 25'. A recess 68 on the outer circumference of the outer sleeve 25' communicates the radial hole 67 with a bore 69 opening to the bore 12 of the piston 3. An annular space 70 and a spiral groove 71 between the steering nut 11 and the piston 3 communicate with the bore 69.

The spool valves 27, 27' are of an open center system type with the neutral position thereof establishing communication between and annular chambers 45 and 46, 46 and 47, 49 and 50, and 50 and 51. The centering force produced by the springs 31, 31' effectively maintain the spool valves 27, 27' in neutral position in their respective bores.

With the above construction the spool valves 27, 27' when in their neutral position form an open center system which connects all of the passages for flow of the operating fluid while the vehicle is running straight. Thus, operating fluid pressured by the pump 35 is delivered to the radial holes 41, 41' respectively of the outer sleeves 25, 25' through the conduit 36, the inlet port 37, the longitudinal groove 38 of the piston 3, and the passage holes 39, 40 extending from the groove 38. The operating fluid then flows into the annular chambers 45 and 49 respectively and then to the annular chambers 46, 50 respectively through the slight spaces between the lands 27b and 27'b of the spool valves 27 and 27' and the sleeves 25 and 25' and is finally delivered to the right and left pressure chambers 5 and 4. At this time spools 27, 27' in their neutral center position there is no thrusting force upon the piston 3 produced by the operating fluid as the pressure is balanced in chambers 4 and 5. The operating fluid delivered into the annular chambers 46 and 50 returns to the reservoir 63 through slight spaces between the lands 27a and 27'a of the spool valve 27 and 27' respectively and the sleeves 25 and 25'. The annular chambers 47 and 51 respectively connect to the exhaust passage 54 and then to the reservoir as previously explained.

When the steering shaft 8 is rotated in the direction indicated by the arrow line A in FIG. 1 which is counter clockwise when viewed in FIG. 2 the normal affect would be to move the piston 3 axially in the bore 2. The friction of the vehicle road wheels and their linkage to the sector-shaft 6 retards the movement of the piston 3 and hence the steering nut 11 turns with the shaft 8 within the bore 12 of the piston 3. Rotation of the nut 11 with respect to the piston 3 rotates the pins 34, 34' and causes the spools 27, 27' to move along their own axes in opposite directions against the force of the springs 31, 31' respectively. As seen in FIG. 2 the spool 27 is moved downwardly and the spool 27' is moved upwardly.

Following the movement of the spools 27, 27' the operating fluid from the pump 35 is delivered to the annular chambers 45 and 49 through the passages and the radial holes 41, 41' of the sleeves 25, 25'. The land 27b of the spool valve 27 closes the chambers 45 to prevent further movement of the operating fluid therefrom. The land 27b' of the spool valve 27' permits the flow of pressure fluid from the chamber 49 into the chamber 50 and from there into the left pressure chamber 4 through the radial hole 67 of the sleeve 25', the recess 68 in the outer circumference of the sleeve 25', the hole 69 opening to the bore 12 of the piston 3, and the annular space 70 including the spiral groove 71 between the steering nut 11 and the piston 3. Now the operating fluid within the left pressure chamber 4 works as a rightward thrust on the piston 3. At the same time the operating fluid within the right pressure chamber 5 returns to the reservoir 63 through the passageway 66 opening to the chamber 7 and its connecting chamber 5, the passageway 65, the radial hole 64, the chamber 46, the slight space between the sleeve 25 and the land 27a of the spool valve 27, the annular chamber 47 and the passage 54.

The thrust force created in the above mentioned operation urges the piston 3 rightward as viewed in FIG. 1 which in turn causes rightward rotation of the sector-shaft 6 to steer the vehicle wheels. Briefly the system as a whole provides servo-operation and as turning movement of the shaft 8 ceases the springs 31, 31' return the spool valve 27, 27' to their neutral positions respectively.

For opposite turning movement of the vehicle the shaft 8 is rotated in the opposite direction and the valves A and B operate oppositely to pressure the right end of the piston 3 to move it leftward with respect to the housing 1.

Manual operation of the system of the present invention upon failure of the power system occurs through the key 20 which locks the nut 11 to the piston 3 after the nut 11 has been permitted to rotate through a small arc.

As disclosed above in detail during the assembly of the control valve A and B the control valve A is pressed into the bore 24 in the piston 3 and the control valve B is loosely engaged in the bore 24' until it is aligned by the pins 34, 34' after which it is locked by the pin 32. The construction of the sleeves and spool valves need not be precise since the very accurate neutral positions thereof is obtained by locking the valve B only after it has been correctly positioned in its bore 24'.

While the embodiment described above illustrates the control valve A and B installed in the piston it should, however, be obvious that they may be installed in the housing or other receptacles for the valves. In addition both the control valves A and B can be firmly secured in their bores in the receiver with pins rather than having one of the control valves pressed into its bore. The control valves may also be installed axially along the piston even though the preferred embodiment utilizes an eccentrically positioned valve in a plane crossing the axis of the piston at right angles.

Having thus described the preferred embodiment of the invention it should be understood that numerous structural modifications and adaptations may be resorted to without departing from the spirit of the invention.

What is claimed is:

1. A fluid power steering apparatus for vehicles comprising a cylinder adapted to receive hydraulic operating fluid under pressure connected from a source, a piston mounted within said cylinder for axial sliding movement and defining a pair of pressure chambers at opposite ends of said cylinder, a sector-shaft mounted in said cylinder for operative connection with the steering road wheels of a vehicle and operatively connected to said piston, a rotatable member confined within said piston and connected operatively with a manually rotated shaft extending into said cylinder, and open center control valve means for controlling the supply of operating fluid into said pair of chambers in response to rotation of said shaft, said open center control valve means including a first control valve having an outer sleeve member fixedly secured in a first bore in said piston, a spool valve received in said sleeve member, and a first spring for normally maintaining said spool valve in neutral position in said outer sleeve member, a second control valve having a second outer sleeve member mounted for axial movement in a second bore in said piston, a second spool valve slidably engaged in said outer sleeve member, and a second spring for normally maintaining said second spool valve in neutral position in said second outer sleeve member, a pair of connecting members secured on said rotatable member engaged with said first and second spool valves to displace them axially and oppositely upon rotation of said shaft, and a member fixing said second outer sleeve member in said piston in axially adjusted relation with said first and second spool valves in neutral position.

2. A device as claimed in claim 1 wherein said first outer sleeve member is pressed firmly into its operative position where it is fixed within said piston.

3. A device as claimed in claim 1 wherein the member fixing said second outer sleeve member in adjusted position in said piston is a fixing pin extending through said piston and locking said second sleeve member in axially adjusted position.

4. A device as claimed in claim 1 wherein each of said outer sleeve members are rigidly secured against axial movement with respect to said piston by means of fixing pins extending through said pistons into said outer sleeve members.

5. A fluid power steering apparatus for vehicles comprising a housing defining a cylinder, a piston mounted within said cylinder for axial sliding movement and defining a pair of pressure chambers within said cylinder at opposite ends of said piston, a sector-shaft mounted in said cylinder for operative connection with the steering road wheels of a vehicle and operatively connected to said piston, a rotatable member confined within said piston and connected operatively with a manually rotated shaft extending into said cylinder, a pair of control valves for controlling operating fluid supplied into said pair of pressure chambers in response to rotation of said shaft, and an hydraulic circuit including a first inlet passage in said housing adapted to be connected with a source of hydraulic operating fluid under pressure, a second inlet passage in said piston and connected with said first inlet passage, a first outlet passage in said piston connected to said second inlet passage through said pair of control valves for controlling supply of operating fluid into said pair of pressure chambers from said second inlet passage, a first intermediate passage formed between said piston and said shaft and connected with said first outlet passage, a second intermediate passage provided axially in said shaft and connected with said first intermediate passage, and a second outlet passage formed in said housing and connected with said second intermediate passage.

* * * * *

UNITED STATES PATENT OFFICE
CERTIFICATE OF CORRECTION

Patent No. 3,739,868      Dated June 19, 1973

Inventor(s) TADASHI MAEKAWA, AKIRA SUZUKI and SHIGENORI HARAMURA

It is certified that error appears in the above-identified patent and that said Letters Patent are hereby corrected as shown below:

In Claim 1, column 6, line 20, after "engaged in said" insert --second--.

Signed and sealed this 19th day of February 1974.

(SEAL)
Attest:

EDWARD M. FLETCHER, JR.
Attesting Officer

C. MARSHALL DANN
Commissioner of Patents